United States Patent [19]

Parsons

[11] Patent Number: 4,840,164
[45] Date of Patent: Jun. 20, 1989

[54] METHOD AND APPARATUS FOR SUPERCHARGING INTERNAL COMBUSTION ENGINES

[75] Inventor: Bryan N. V. Parsons, Stoney Stanton, England

[73] Assignee: Jaguar Cars Limited, England

[21] Appl. No.: 145,059

[22] Filed: Jan. 19, 1988

[30] Foreign Application Priority Data

Jan. 24, 1987 [GB] United Kingdom ............ 8701578

[51] Int. Cl.$^4$ ............... F02B 29/02; F02B 47/08
[52] U.S. Cl. ............................ 123/559.1; 123/568
[58] Field of Search ......................... 123/559.1, 568

[56] References Cited

U.S. PATENT DOCUMENTS

| | | | |
|---|---|---|---|
| 1,377,535 | 5/1921 | White | 123/559.1 X |
| 1,831,470 | 11/1931 | Sherbondy | 123/559.1 |
| 2,983,267 | 5/1961 | Percival | 123/559.1 |
| 4,548,173 | 10/1985 | Yabumoto et al. | 123/308 |
| 4,735,186 | 4/1988 | Parsons | 123/568 |

FOREIGN PATENT DOCUMENTS

| | | | |
|---|---|---|---|
| 3115772 | 11/1982 | Fed. Rep. of Germany | 123/559.1 |
| 183863 | 7/1922 | United Kingdom. | |
| 226502 | 10/1924 | United Kingdom | 123/559.1 |

Primary Examiner—Michael Koczo
Attorney, Agent, or Firm—Davis, Bujold & Streck

[57] ABSTRACT

A method and apparatus of supercharging an internal combustion engine in which a pulsed jet of gas is injected at high velocity into a mixing chamber where momentum exchange between the jet and air or air/fuel mixture in the mixing chamber will accelerate the air or air/fuel mixture towards an outlet from the mixing chamber which is connected to an inlet port of a cylinder of the engine and induce further air or air/fuel mixture into the mixing chamber, to provide a pulsed induction charge at increased pressure, the pulsed induction charge being timed to arrive at the cylinder towards the end of the induction stroke thereof.

11 Claims, 4 Drawing Sheets

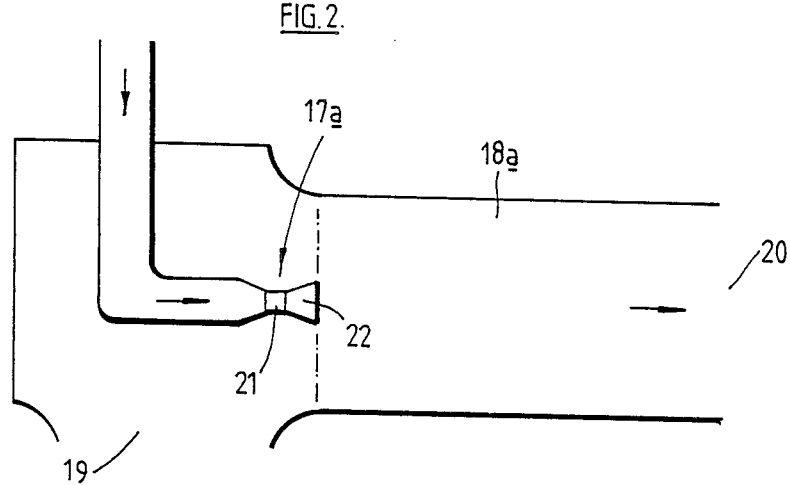
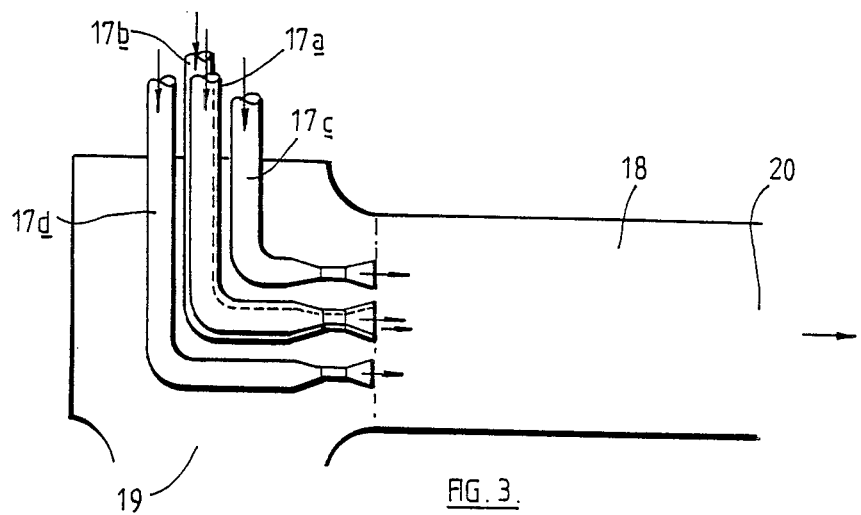

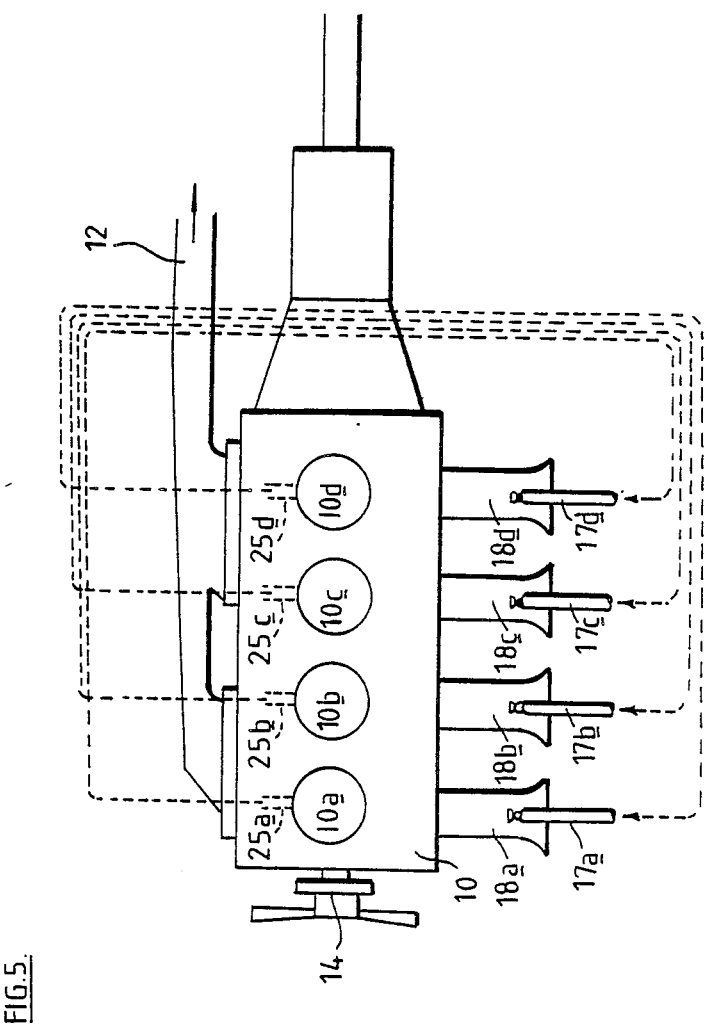

METHOD AND APPARATUS FOR SUPERCHARGING INTERNAL COMBUSTION ENGINES

BACKGROUND OF THE INVENTION

The present invention relates to the supercharging of internal combustion engines. The power of an internal combustion engine may be increased by increasing the volume of the air/fuel mixture that is delivered to the cylinders. This process of supercharging is achieved by increasing the pressure of the air of air/fuel mixture that is delivered to the cylinders, above atmospheric pressure. In the past supercharging of internal combustion engines has been achieved by one of two methods, that is by the use of a mechanically driven positive displacement pump or supercharger, or by an exhaust driven pump or turubocharger. In both cases, all the air supplied to the engine passes through the supercharging pump.

Mechanically driven superchargers work well at low engine speeds, but their size and power requirements have made these units unpopular and they have been superceded in recent years by turbochargers. Turbochargers, being driven by the exhaust gasses of the engine, impose a relatively low power loss and are relatively compact. The main drawbacks of turbochargers are their poor throttle response, their need to work at relatively high engine speeds for good performance, and problems with increase in temperature of the induced air due to conduction from the exhaust gasses. Furthermore, the known superchargers or turbochargers provide a continuous supply of pressurised air which is delivered to the engine when the inlet ports are closed as well as on the induction strokes. Moreover, pressurised air will be supplied to the engine throughout the induction stroke. However, it is more efficient to supercharge only towards the end of the induction stroke, when the amount of air drawn into the cylinder under normal aspiration is reducing.

SUMMARY OF THE INVENTION

According to one aspect of the present invention a method of supercharging an internal combustion engine comprises; injecting a high velocity pulsed jet of gas into a mixing chamber containing air or an air/fuel mixture, so that momentum exchanged between the jet of gas and air or air/fuel mixture will accelerate the air or air/fuel mixture towards an outlet which is connected to an inlet port of a cylinder of the engine and further air or air/fuel mixture at atmospheric pressure will be entrained into the mixing chamber through an inlet thereto, to provide a pulsed induction charge of air or air/fuel mixture at increased pressure, said pulsed induction charge being delivered to the cylinder so that an induction charge pulse is timed to arrive at the cylinder towards the end of the induction stroke.

According to a preferred embodiment of the invention the induction charge pulse is delivered to the cylinder after the piston has completed of the order of 90% of its induction stroke.

The pulsed gas jet injected into the mixing chamber is preferably at supersonic velocity and may have a mass flow of approximately ten per cent of the cylinder capacity. In such circumstances, boost pressures of, for example the order of twenty-five per cent may be achieved.

According to a further aspect of the present invention an apparatus for supercharging an internal combustion engine comprises a mixing chamber having an inlet open to a source of air or an air/fuel mixture at atmospheric pressure and an outlet adapted to be connected to an inlet port of a cylinder of an internal combustion engine, a nozzle opening into said mixing chamber and means of supplying a pulse of gas at high pressure to said nozzle to inject a high velocity jet of gas into the mixing chamber, so that said jet of gas will accelerate the air or air/fuel mixture in the mixing chamber towards the outlet and entrain more air or air/fuel mixture into the mixing chamber through the inlet to form an induction charge pulse, means being provided to time delivery of said pulse to a cylinder of the engine, towards the ends of an induction stroke.

Various means may be used to provide the pulsed gas jet. Such means include:

1. A small positive displacement pump, preferably with an exhaust heat exchanger to heat the gas before it reaches the nozzle. The pump would preferably have a capacity of about ten per cent of the engine delivery requirements. The system would conveniently use air, although other gasses could be used. The pump may have one or more cylinders and be driven in synchronisation with the engine to provide the required timing of the induction charge pulses.

2. Utilisation of high pressure combustion products of the engine by, for example;
    (a) Removal of very high pressure and temperature gas by means of a piston controlled port, part way down the cylinder;
    (b) Tapping of pressure pulses in the exhaust system.

Preferably, separate pulsed jets of gas will be produced for each cylinder of the combustion engine and these will be fed via nozzles to separate mixing chambers, each serving one of the cylinders. However, one or more pulsed jets of gas may be delivered to a common mixing chamber which will deliver a pulsed induction charge, via a tuned induction manifold common to all the cylinders.

BRIEF DESCRIPTION OF DRAWINGS

Various embodiments of the invention are now described, by way of example only, with reference to the accompanying drawings in which:

FIG. 2 is an enlarged view of the mixing chamber/jet assembly used in the system illustrated in FIG. 1;

FIG. 3 shows an alternative form of mixing chamber/jet assembly used in a modified version of the system illustrated in FIG. 1;

FIG. 5 is a schematic illustration of a second supercharging system formed in accordance with the present invention.

DESCRIPTION OF A PREFERRED EMBODIMENT

Figure 1:
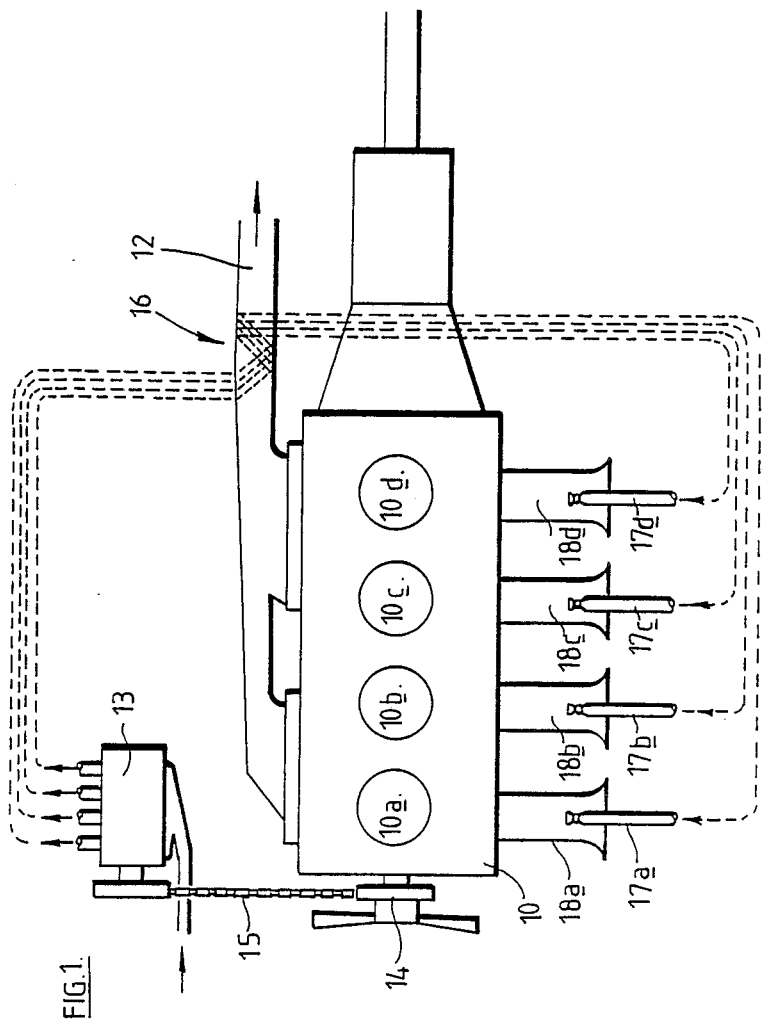
FIG. 1 is a schematic illustration of a supercharging system formed in accordance with the present invention.

As illustrated in FIG. 1, a supercharging system for an internal combustion engine 10 having four cylinders 10a to 10d comprises a four cylinder compressor 13 which is driven by toothed belt 15 from the crank shaft 14 of engine 10. The compressor 13 has a capacity of the order of ten per cent of the total air requirement for the engne 10. Each cylinder of the compressor 13 supplies pulses of air at high pressure to one of a series of nozzles 17a to 17d, via a heat exchanger 16 in which the air is heated by exhaust gasses passing through the exhaust system 12. Each nozzle 17a to 17d opens into a mixing chamber 18a to 18d each having an inlet 19 for air at atmospheric pressure and an outlet 20 which is connected to the inlet port of one of the cylinders 10a to 10d.

As illustrated in greater detail in FIG. 2 the nozzles 17a and 17d have a narrow throat portion 21 and a divergent nozzle portion 22. The dimensions of the nozzles 17a to 17d are such that the pulse of high pressure air that is supplied by a cylinder of compressor 13 is accelerated to sonic-velocity in the throat portion 21 and to supersonic velocity upon expansion in the divergent nozzle portion 22. Upon exiting from nozzle 17a to 17d into mixing chamber 18a to 18d the supersonic jet of air accelerates the air in mixing chamber 18a to 18d towards outlet 20 and entrains further air into mixing chamber 18a to 18d from atmosphere through inlet 19 to create an induction charge pulse.

The compressor 13 is driven in synchronisation with the engine by belt 15, so that a pulse of air will be fed from one cylinder of the compressor 13 to an appropriate nozzle 17a to 17d, in order to produce an induction charge pulse which is timed to arrive at one cylinder 10a to 10d of the engine 10 at a predetermined point towards the end of the induction stroke of that cylinder 10a to 10d.

Although the pulses of air suplied to nozzles 17a to 17d are heated by heat exchanger 16, as the hot jet stream is only approximately ten per cent of total charge and furthermore undergoes cooling on rapid expansion through the nozzle, there will only be a small temperature rise in the air induced by this system. Further cooling means (not shown) may be provided to avoid excessive rise in the temperature of the air delivered to the cylinders 10a to 10d.

The above system may be used with fuel injection systems, in which case the air at increased pressure is delivered directly to the cylinders by conventional valve means and the appropriate amount of fuel is injected. Alternatively, the system described above may be modified so that an air/fuel mixture is supplied via inlet 19 to mixing chamber 18. As described above, the air/fuel mixture will then be pressurised and may then be fed directly to the cylinders by conventional valve means. With engines of this type the inlet valve will typically open at about 30° before top dead centre and close at about 55° after bottom dead centre. The induction charge pulse will typically be delivered to the cylinder after it has completed 90% of its induction stroke, so that air or air/fuel mixture at a pressure in excess of atmospheric pressure will be forced into the cylinder until the inlet valve closes at 55° after bottom dead centre.

As illustrated in FIG. 3, all four nozzles 17a and 17d may be grouped together and open into a common mixing chamber 18, which may be connected to the inlet ports of all four cylinders 10a to 10d, by a common inlet manifold. As pulsed jets of air are fed to the nozzles 17a to 17d, each pulse will produce an induction charge pulse as described above. A series of induction charge pulses will thus be fed to the induction manifold, these pulses being timed to arrive when one cylinder of the engine is at the appropriate point on its induction stroke.

Figure 4:
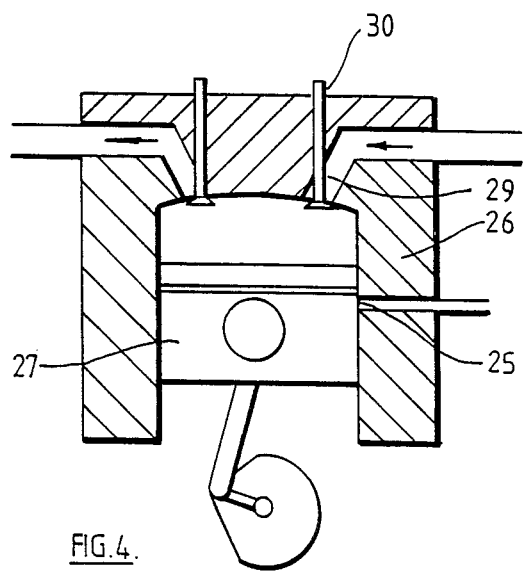
FIG. 4 shows a schematic layout of a cylinder with piston controlled port for producing a pulsed jet of exhaust gas which may be used in place of the compressor in the system illustrated in FIG. 1.

As an alternative to the multi-cylinder air compressor described above, high pressure pulses of gas may be removed from the engine cylinders 10a to 10d, on the expansion stroke. FIG. 4 illustrates an arrangement of a combustion chamber suitable for this purpose. A port 25 is provided in the wall of cylinder 10a in a position where it will be covered and uncovered by a piston 27, at a point towards the bottom of its stroke. Uncovering the port 25 towards the end of the expansion stroke of piston 27 will enable a pulse of combustion gases at high pressure to pass through port 25.

The pulses of combustion gasses are fed to one of the nozzles 17a of the system illustrated in FIG. 1, and thence to one of the mixing chambers 18a to produce induction charge pulses. Likewise the other cylinders 10b to 10d are provided with similar ports 25 which are interconnected to nozzles 17b to 17d, to feed pulses of combustion gasses to mixing chambers 18b to 18d respectively.

With a four cylinder engine, cylinders 10a and 10d are normally 180° out of phase with cylinders 10b and 10c, so that when cylinder 10a is on the expansion stroke, cylinder 10d will be on the induction stroke, cylinder 10b is on its exhaust stroke and cylinder 10c is on its compression stroke. The mixing chamber 18a which is connected via nozzle 17a to cylinder 10a is consequently arranged to deliver induction charge pulses to the inlet port of cylinder 10d, so that the induction charge pulses are delivered towards the end of the induction stroke of cylinder 10d. Similarly the port 25 of cylinder 10d will be connected to the inlet port of cylinder 10a ; port 25 of cylinder 10b will be connected to the inlet port of cylinder 10c and port 25 of cylinder 10c will be connected to the inlet port of cylinder 10d, as can be seen in FIG. 5. With these arrangements, the position of the port 25 must be set to take account of delays in delivering the induction charge pulse to the inlet port of the associated cylinder, so that the appropriate timing of the pulse is achieved.

With the fixed nozzles 17a to 17d, as described above, the speed of the jet emerging from the nozzles depends upon the mass flow rate of the gas delivered to the nozzle. For a given fixed nozzle, the compressor must consequently be of sufficient size to provide an adequate supply of pressurised gas over a wide range of engine speeds. The size of the compressor required may however be reduced by using nozzles in which the nozzle area can be varied with the changing mass flow rate, so as to maintain an appropriate jet velocity.

I claim:

1. A method of supercharging a multi-cylinder internal combustion engine comprising, tapping exhaust gases from each of the cylinders of the engine towards the end of its expansion stroke to provide a high velocity pulsed jet of gas, injecting the high velocity pulse jet of gas from one cylinder into a mixing chamber connected to an inlet port of another cylinder, said mixing chamber containing air so that the momentum exchanged between the jet of gas and the air will accelerate the air to provide a pulsed induction charge of the air, said pulsed induction charge being delivered to said other cylinder towards the end of the induction stroke of said other cylinder.

2. A method according to claim 1 in which the induction pulse is delivered to the cylinder after the piston has completed of the order of 90% of its induction stroke.

3. A method according to claim 1 in which the pulsed gas jet is injected into the mixing chamber at supersonic velocity.

4. A method according to claim 1 in which the mass flow rate of the jet of gas is of the order of ten per cent of the charge requirement of the cylinder.

5. A method according to any one of claim 1 in which the jet of gas is provided by forcing a high pressure pulse of gas through a nozzle.

6. A method of supercharging a multi-cylinder internal combustion engine comprising, tapping exhaust gases from each of the cylinders of the engine towards the end of its expansion stroke to provide a high velocity pulsed jet of gas, injecting the high velocity pulse jet of gas from one cylinder into a mixing chamber connected to an inlet port of another cylinder, said mixing chamber containing an air/fuel mixture so that the momentum exchanged between the jet of gas and the air/fuel mixture will accelerate the air/fuel mixture to provide a pulsed induction charge of the air/fuel mixture, said pulsed induction charge being delivered to said other cylinder towards the end of the induction stroke of said other cylinder.

7. A method according to claim 6 in which the induction pulse is delivered to the cylinder after the piston has completed of the order of 90% of its induction stroke.

8. A method according to claim 6 in which the pulsed gas jet is injected into the mixing chamber at supersonic velocity.

9. A method according to claim 6 which the mass flow rate of the jet of gas is of the order of ten per cent of the charge requirement of the cylinder.

10. A method according to claim 6 in which the jet of gas is provided by forcing a high pressure pulse of gas through a nozzle.

11. An apparatus for supercharging a multi-cylinder combustion engine, each cylinder having a piston controlled port, said port being uncovered towards the end of an expansion stroke of the piston, mixing chambers being connected to an inlet port of each of the cylinders, said mixing chambers having an inlet opening to a source of at least one of air and air/fuel mixture at atmospheric pressure, a nozzle opening into each mixing chamber, the nozzle associated with the inlet port of one cylinder being connected to the piston controlled port of another cylinder, said one cylinder being 180 degrees out of phase with said other cylinder.

* * * * *